(12) United States Patent
Paulson et al.

(10) Patent No.: US 9,480,900 B2
(45) Date of Patent: *Nov. 1, 2016

(54) CHANGEUP CONTROLLER FOR BALL THROWING MACHINE

(71) Applicant: Jugs Sports, Inc., Tualatin, OR (US)

(72) Inventors: Kerry K. Paulson, Sherwood, OR (US); Robert F. Harder, Yamhill, OR (US)

(73) Assignee: Jugs Sports, Inc., Tualatin, OR (US)

( * ) Notice: Subject to any disclaimer, the term of this patent is extended or adjusted under 35 U.S.C. 154(b) by 324 days.

This patent is subject to a terminal disclaimer.

(21) Appl. No.: 13/959,625

(22) Filed: Aug. 5, 2013

(65) Prior Publication Data

US 2013/0319387 A1    Dec. 5, 2013

Related U.S. Application Data

(63) Continuation-in-part of application No. 13/268,195, filed on Oct. 7, 2011.

(51) Int. Cl.
*F41B 4/00* (2006.01)
*A63B 69/40* (2006.01)
*H02P 29/00* (2016.01)

(52) U.S. Cl.
CPC .............. *A63B 69/406* (2013.01); *H02P 29/00* (2013.01); *A63B 2069/401* (2013.01); *A63B 2069/402* (2013.01); *A63B 2102/18* (2015.10); *A63B 2220/34* (2013.01); *A63B 2220/36* (2013.01); *A63B 2220/805* (2013.01); *A63B 2225/50* (2013.01); *H02P 2205/07* (2013.01)

(58) Field of Classification Search
None
See application file for complete search history.

(56) References Cited

U.S. PATENT DOCUMENTS

| | | | |
|---|---|---|---|
| 3,602,208 A | 8/1971 | Huerlimann | |
| 4,086,903 A | 5/1978 | Scott | |
| 4,442,823 A | 4/1984 | Floyd et al. | |
| 5,359,986 A | 11/1994 | Magrath, III et al. | |
| 5,390,915 A * | 2/1995 | Levatino | 473/453 |
| 5,464,208 A | 11/1995 | Pierce | |

(Continued)

FOREIGN PATENT DOCUMENTS

| | | |
|---|---|---|
| CN | 201244336 | 5/2009 |
| JP | 2002-239052 A | 8/2002 |
| JP | 2002-537919 A | 11/2002 |

OTHER PUBLICATIONS

Office Action issued Nov. 26, 2013 from Japanese Patent Application No. 2012-223107.

(Continued)

*Primary Examiner* — Melba Bumgarner
*Assistant Examiner* — Amir Klayman
(74) *Attorney, Agent, or Firm* — Schwabe, Williamson & Wyatt, P.C.

(57) ABSTRACT

Embodiments provide a ball throwing machine including a motor coupled to a rotary wheel and configured to rotate the rotary wheel at a rotational speed to throw a ball forward toward an athlete. A speed control module may be coupled to the motor and configured to rotate the rotary wheel, via the motor, at a first rotational speed during a fastball setting and a second rotational speed during a changeup setting. The speed control module may determine the second rotational speed based on the first rotational speed so that a ball thrown by the ball throwing machine will arrive in a target zone when the ball throwing machine is in the fastball setting and the changeup setting.

19 Claims, 8 Drawing Sheets

(56) References Cited

U.S. PATENT DOCUMENTS

| | | |
|---|---|---|
| 5,897,445 A | 4/1999 | Sanders et al. |
| 6,102,021 A | 8/2000 | Sanders et al. |
| 6,186,134 B1 | 2/2001 | Battersby et al. |
| 6,305,366 B1 | 10/2001 | Rizzo et al. |
| 6,440,013 B1 | 8/2002 | Brown |
| 6,470,873 B2 | 10/2002 | Battersby et al. |
| 6,895,949 B1 | 5/2005 | Stephens |
| 7,383,832 B2 | 6/2008 | Soberg |
| 2002/0185120 A1 | 12/2002 | Scott |
| 2003/0195061 A1 | 10/2003 | Brown |
| 2004/0050690 A1 | 3/2004 | Green et al. |
| 2005/0016516 A1 | 1/2005 | Richard |
| 2013/0237378 A1* | 9/2013 | Carrell .......................... 482/51 |

OTHER PUBLICATIONS

Final Rejection issued Aug. 12, 2014 from Japanese Patent Application No. 2012-223107.
Office Action issued Jun. 25, 2015 from U.S. Appl. No. 13/268,195.
Office Action issued Aug. 4, 2015 from Japanese Patent Application No. 2012-223107.
Notice of Allowance mailed Mar. 29, 2016 from Japanese Patent Application No. 2012-223107, 3 pages.

* cited by examiner

CHANGEUP CONTROLLER FOR BALL THROWING MACHINE

RELATED APPLICATIONS

The present application is a continuation-in-part of U.S. patent application Ser. No. 13/268,195, filed Oct. 7, 2011, and titled "CHANGEUP CONTROLLER FOR BALL THROWING MACHINE," the entire disclosure of which is hereby incorporated by reference.

TECHNICAL FIELD

Embodiments herein relate to the field of ball throwing machines.

BACKGROUND

Ball throwing machines are used to throw baseballs, softballs, tennis balls and the like. For baseballs or softballs, the ball throwing machine may be used in batting practice to repeatedly throw balls to a batter which the batter attempts to hit. Some ball throwing machines can throw different types of pitches, such as fastballs, changeups, and/or curveballs. However, these ball throwing machines require physical adjustment to change the pitch type so that the pitches arrive at the batter in the proper position (e.g., the strike zone). The adjustment may require a longer pause between pitches, and/or changing the position of one or more components of the ball throwing machine. The batter may recognize the longer delay between pitches and/or see the adjustment of the machine, and this may indicate to the batter that a different pitch is coming, thereby negating the surprise element in batting practice.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

DETAILED DESCRIPTION OF DISCLOSED EMBODIMENTS

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "NB" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

In various embodiments, methods, apparatuses, and systems for a pitching machine controller are provided. In exemplary embodiments, a computing device may be endowed with one or more components of the disclosed apparatuses and/or systems and may be employed to perform one or more methods as disclosed herein.

Embodiments herein provide a speed control module for a pitching machine. The pitching machine may include one or more rotary wheels and a motor associated with each rotary wheel. The motors may cause their associated rotary wheels to rotate. The pitching machine may further include a feed structure configured to receive a ball and bring the ball into contact with a circumferential outer surface of the one or more rotary wheels. The ball may be thrown outwardly by rotation of the one or more rotary wheels.

In various embodiments, the speed control module may be coupled to the motor and configured to rotate the rotary wheel, via the motor, at a first rotational speed during a fastball setting and a second rotational speed during a changeup setting. The speed control module may determine the second rotational speed based on the first rotational speed so that a ball thrown by the ball throwing machine will arrive in a target zone when the ball throwing machine is in the fastball setting and the changeup setting. In some embodiments, the speed control module may utilize resistive braking to transition the rotary wheel from the first rotational speed to the second rotational speed.

In some embodiments, the speed control module may be coupled to a speed measurement module to measure the rotational speed of the rotary wheel. The speed measurement module may be used, for example, to measure the first rotational speed of the rotary wheel during the fastball setting in order to determine a target second rotational speed of the rotary wheel during the changeup setting. Additionally, or alternatively, the speed measurement module may be used to achieve a desired rotational speed of the wheel (e.g., the first and/or second rotational speeds) via a feedback loop. The speed measurement module may measure the rotational speed of the rotary wheel in any suitable way, such as magnetically, optically, via a tachometer, and/or by measuring a parameter (e.g., voltage level, current level, and/or duty cycle) of a control signal used to control the motor.

Figure 1:
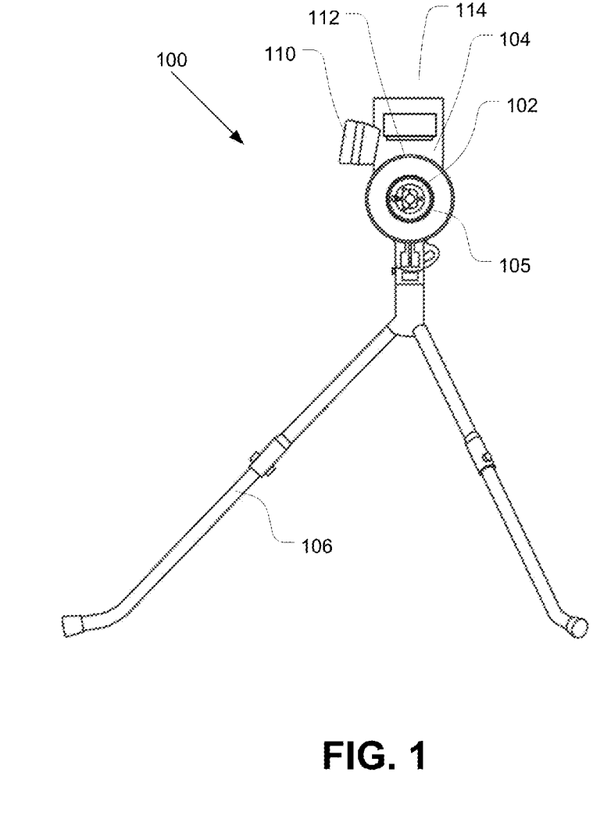
FIG. 1 illustrates a side view of a ball throwing machine in accordance with various embodiments.
Figure 2:
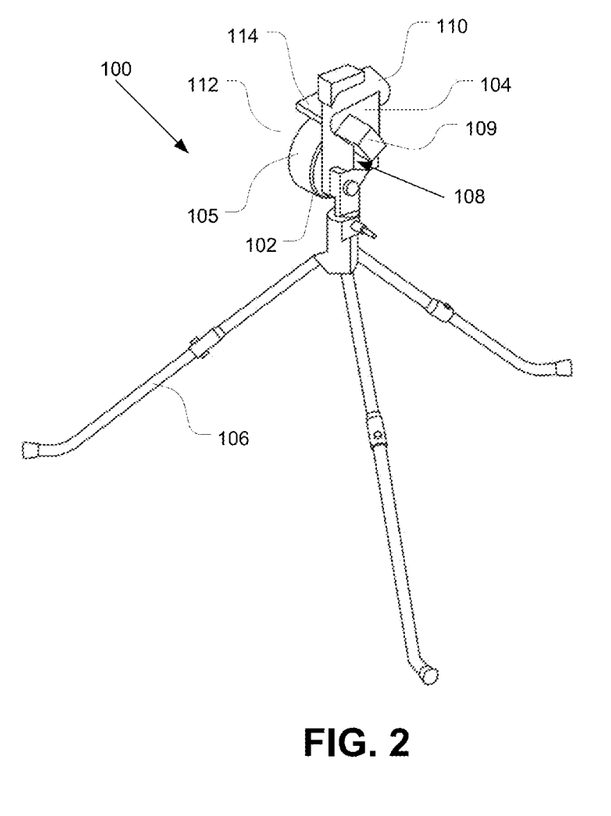
FIG. 2 illustrates a perspective view of the ball throwing machine of FIG. 1.

Referring to FIGS. 1 and 2, a ball throwing machine 100 may include a rotary wheel 102 coupled to a body portion 104 and supported on the ground by a support structure 106 (e.g., a tripod 106). In some embodiments, the rotary wheel 102 may include a pneumatic tire 105. A motor 108 may be coupled to the rotary wheel 102 and configured to rotationally drive the rotary wheel 102. The ball throwing machine 100 may further include a feed structure 110 coupled to the support structure and configured to receive a ball (not shown) and bring the ball into contact with an outer circumferential surface 112 of the rotary wheel 102. The feed structure may be configured for hand-feeding of balls by an operator, and/or may be configured to automatically feed balls periodically to the rotary wheel 102.

A pinch plate 114 may be coupled to the body portion and spaced apart from the outer circumferential surface 112 of the rotary wheel 102 at a distance less than the diameter of the ball. The pinch plate 114 may pinch the ball against the rotary wheel 102, and the rotary wheel 102 may throw the ball outwardly from the ball throwing machine 100 toward a batter (not shown).

A control box 109 may be coupled to the motor 108 and configured to control the rotational speed of the rotary wheel 102. In various embodiments, the ball throwing machine 100 may be selectively placed in a fastball setting and/or a changeup setting to throw a fastball pitch (a throw of relatively high speed) or a changeup pitch (a throw of relatively low speed), respectively. The motor 108 may rotate at a first rotational speed (i.e., a fastball rotational speed) during the fastball setting and at a second rotational speed (i.e., a changeup rotational speed) during the changeup setting. The second rotational speed may be slower than the first rotational speed. Accordingly, the ball throwing machine 100 may throw the ball with a faster speed when in the fastball setting than when in the changeup setting.

Figure 3:
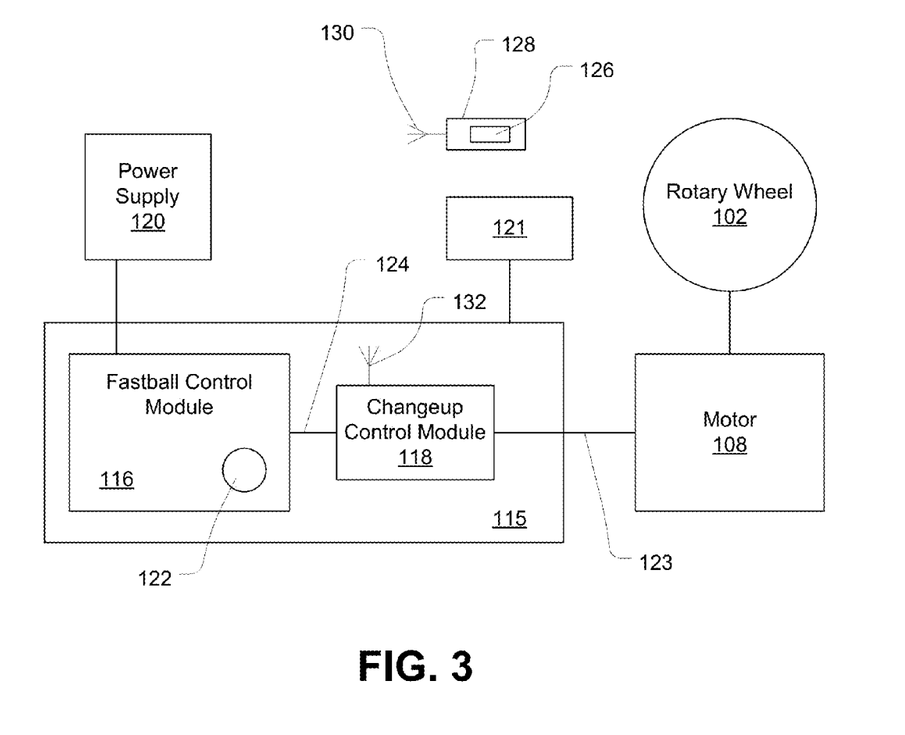
FIG. 3 illustrates a functional block diagram of the ball throwing machine of FIG. 1.

As shown in FIG. 3, the ball throwing machine 100 may include a speed control module 115. The speed control module 115 may be located in the control box 109 (as shown in FIG. 2). The speed control module 115 may be coupled to a power supply 120. The fastball control module 116 may be coupled to a power supply 120. The power supply 120 may be any suitable source of power, such as a 120 volt alternating current (AC) power source (e.g., a wall socket), a battery, and/or any other suitable power source.

In some embodiments, the speed control module 115 may include a fastball control module 116 (also referred to as a base speed control module 116) and a changeup control module 118. The speed control module 115 may further include a speed control mechanism 122, coupled to the fastball control module 116, to allow an operator to specify a fastball speed setting among a range of speeds. In some embodiments, the speed control mechanism 122 may include a potentiometer having a rotating dial. Alternatively, or additionally, the speed control mechanism 122 may include one or more buttons, a touchscreen and/or a display. When the ball throwing machine 100 is in the fastball setting, the rotational speed of the motor 108 (i.e., the first rotational speed) may be controlled by the fastball control module 116. The first rotational speed of the motor 108 may be determined by the fastball speed setting of the fastball control module 116.

In some embodiments, the fastball control module 116 and changeup control module 118 may be part of the same integrated circuit (e.g., located on the same chip). In other embodiments, the changeup control module 118 may be a separate circuit from the fastball control module 116. In some such embodiments, the changeup control module 118 may be configured to be coupled to a conventional fastball control module 116 of an existing machine.

In various embodiments, the changeup control module 118 may be switchable between an unengaged state (when the ball throwing machine 100 is in the fastball setting) and an engaged state (when the ball throwing machine 100 is in the changeup setting). When in the engaged state, the changeup control module 118 may cause the motor 108 to rotate at the second rotational speed in order to throw a changeup pitch.

Figure 4:
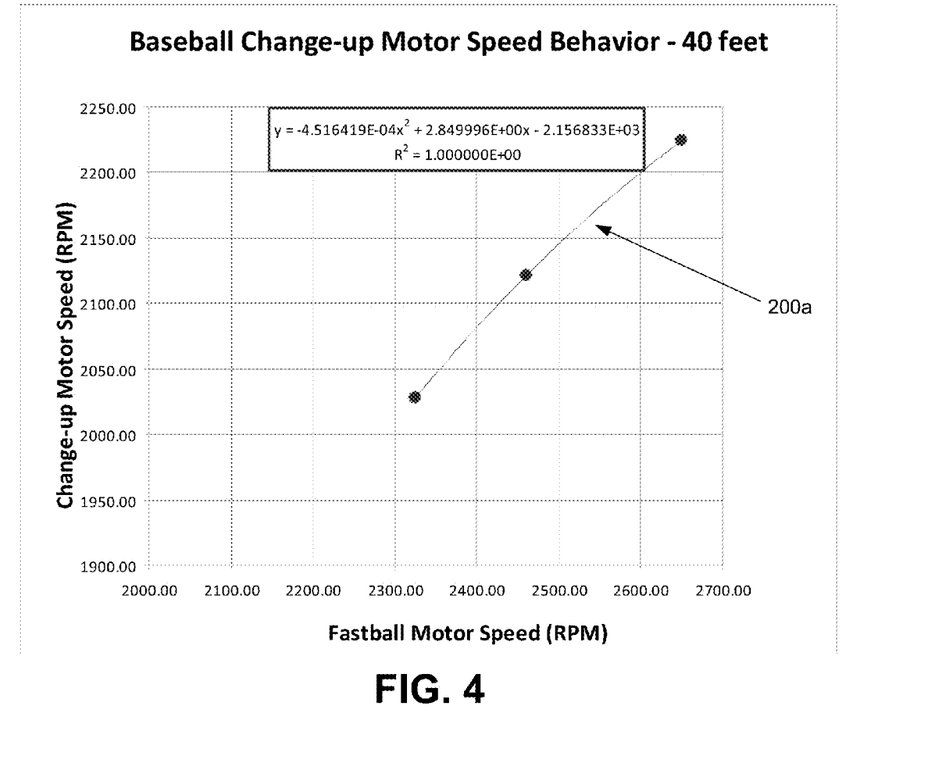
FIG. 4 illustrates a changeup algorithm for a baseball throwing machine, in accordance with various embodiments.
Figure 5:
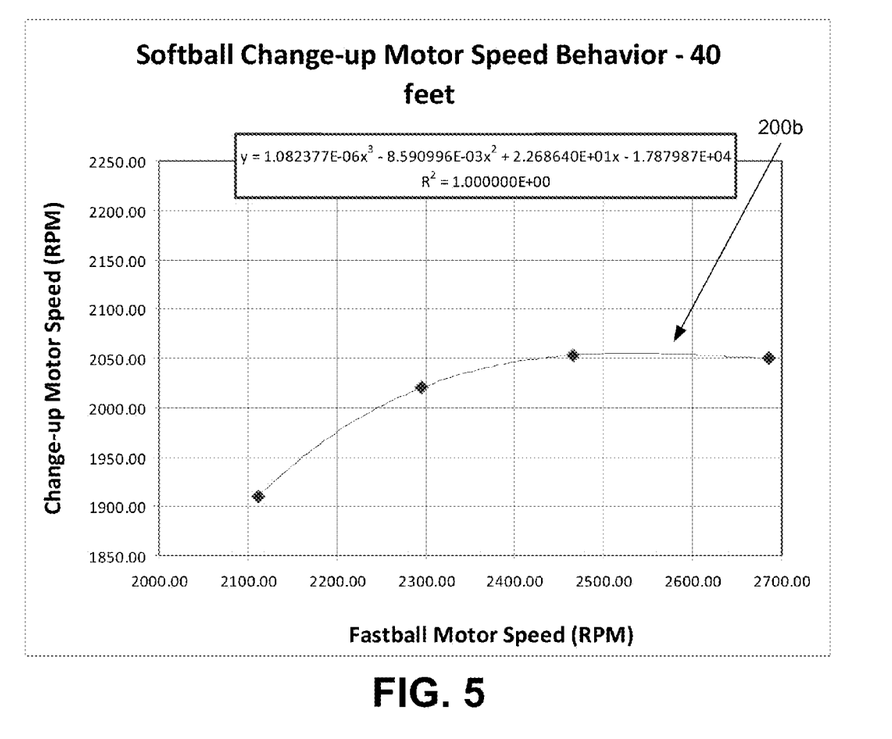
FIG. 5 illustrates a changeup algorithm for a softball throwing machine, in accordance with various embodiments.

In various embodiments, the second rotational speed may be determined based on a changeup algorithm 200a-b (as shown in FIGS. 4 and 5, respectively) applied by the changeup control module. Changeup algorithm 200a may be configured to determine the second rotational speed for throwing baseballs, while changeup algorithm 200b may be configured to determine the second rotational speed for throwing softballs. The changeup algorithm 200a-b may be configured so that the ball will arrive at an athlete (e.g., a batter) within a target zone (e.g., the strike zone) whether the ball throwing machine 100 is in the fastball setting or the changeup setting. The changeup algorithm 200a-b may determine the second rotational speed based at least in part on the first rotational speed. The difference between the first rotational speed and the second rotational speed may vary depending on the magnitude of the first rotational speed. This may facilitate the ball arriving at the batter within the target zone in the fastball setting and the changeup setting. For a fastball pitch of relatively high speed (e.g., 90 miles per hour (mph)), the speed difference between the first rotational speed and the second rotational speed may be greater than the speed difference for a fastball pitch of relatively low speed (e.g., 50 mph), while causing the ball to arrive within the target zone.

In some embodiments, as shown in FIGS. 4 and 5, the changeup algorithm 200a-b may include an equation that determines the second rotational speed based on the first rotational speed. For example, the changeup algorithm may include a polynomial equation (e.g., a second order polynomial equation), a power law equation, an exponential equation, and/or a logarithmic equation, although other types of equations are possible. In other embodiments (not shown), the changeup algorithm 200a-b may determine the second rotational speed based on a percentage of the first rotational speed (e.g., a linear equation). Alternatively, the changeup algorithm 200a-b may include a lookup table of values to correlate the first rotational speed with the second rotational speed. The changeup control module 118 may use the lookup table to determine the second rotational speed based on the first rotational speed.

The changeup algorithm 200a-b may vary depending on a distance setting of the ball throwing machine 100 (i.e., the distance from the ball throwing machine to the batter). In some embodiments, the distance setting may be set by the manufacturer (so that the distance setting is a constant in the changeup algorithm). In other embodiments, the distance setting may be selectively controlled by the operator.

In some embodiments, the changeup control module 118 may include a memory device having the changeup algorithm 200a and/or 200b stored thereon. In some embodiments, the changeup control module may include a memory device having both the baseball changeup algorithm 200a (as shown in FIG. 4) and the softball changeup algorithm 200b (as shown in FIG. 5) stored thereon. The changeup control module 118 may include a switch, such as a dip switch, to selectively configure the changeup control module to use the baseball changeup algorithm 200a or the softball changeup algorithm 200b. The proper algorithm may be set by the manufacturer/retailer prior to delivery of the ball throwing machine 100 and/or the ball throwing machine 100 may include a switch accessible to the operator for changing between throwing baseballs and softballs.

In various embodiments, the changeup algorithm 200a-b may be configured so that a position of the rotary wheel 102, feed structure 110 (including pinch plate 114), and/or other components of the ball throwing machine 100 (as shown in FIGS. 1 and 2) does not need to be changed between throwing a fastball pitch and a changeup pitch for the ball to arrive in the target zone. Accordingly, a trajectory of the ball as it leaves the outer circumferential surface 112 of the ball throwing machine 100 may be the same during the fastball setting and the changeup setting. The trajectory may be determined by the relative angle and/or position of the pinch plate 114 and the rotary wheel 102. This may simplify the design and also facilitate changing the ball throwing machine 100 from the fastball setting to the changeup setting, and vice versa, without the batter noticing.

In various embodiments, the ball throwing machine 100 may include a speed measurement module 121 to measure the rotational speed of the rotary wheel 102. The measured rotational speed may be used, for example, to measure the first rotational speed of the rotary wheel 102 during the fastball setting in order to determine a target second rotational speed of the rotary wheel during the changeup setting. Additionally, or alternatively, the speed measurement module may be used to achieve a desired rotational speed of the wheel (e.g., the first and/or second rotational speeds) via a feedback loop. In some embodiments, the speed measurement module 121 may measure the rotational speed of the rotary wheel, for example, based on a parameter of the control signal used to control the motor 108, as described above. Alternatively, or additionally, the speed measurement module 121 may measure the rotational speed of the rotary wheel by other suitable means, such as magnetically (e.g., including one or more magnets and/or magnetic detectors, optically (e.g., including one or more optical sensors), and/or by using a tachometer.

Figure 10:
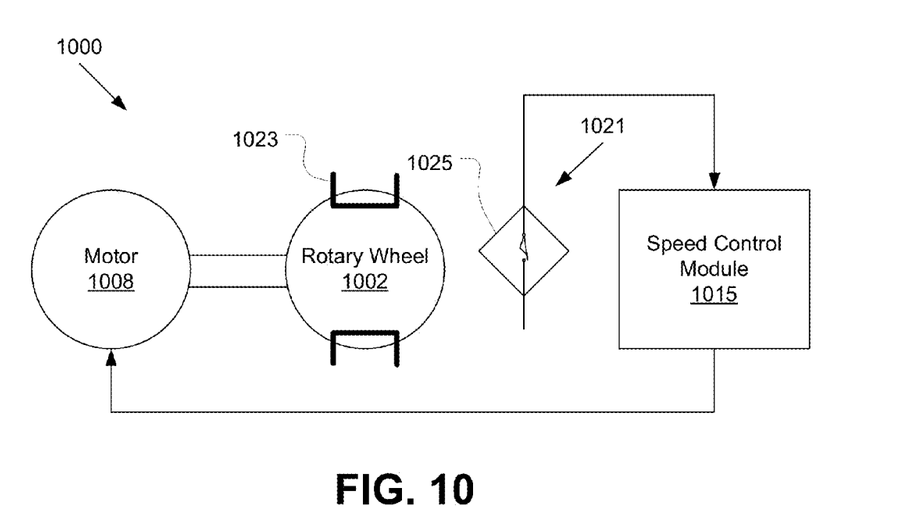
FIG. 10 illustrates a functional block diagram of a ball throwing machine having a speed measurement module to magnetically measure the rotational speed of the rotary wheel, in accordance with various embodiments.

For example, as shown in FIG. 10, a ball throwing machine 1000 may include a rotary wheel 1002, a motor 1008, a speed control module 1015, and a speed measurement module 1021. The speed measurement module 1021 may measure the rotational speed of the rotary wheel 1002 magnetically. For example, speed measurement module 1021 may include one or more magnets 1023, coupled to the rotary wheel 1002, that rotate with the rotary wheel 1002. The speed measurement module 1021 may further include a magnetic detector 1025 that measures the rotational speed of the rotary wheel 1002 by detecting passage of the one or more magnets 1023 as they rotate on the rotary wheel 1002. For example, the magnetic detector 1025 may measure the rotational speed of the rotary wheel 1002 based on the frequency with which the one or more magnets 1023 pass by the magnetic detector 1025. In some embodiments, the magnetic detector 1025 may include a Josephson Junction sensor. The magnetic detector 1025 may be coupled to the speed control module 1015 and may pass a signal to the speed control module 1015 based on a value of the rotational speed of the rotary wheel 1002.

Figure 11:
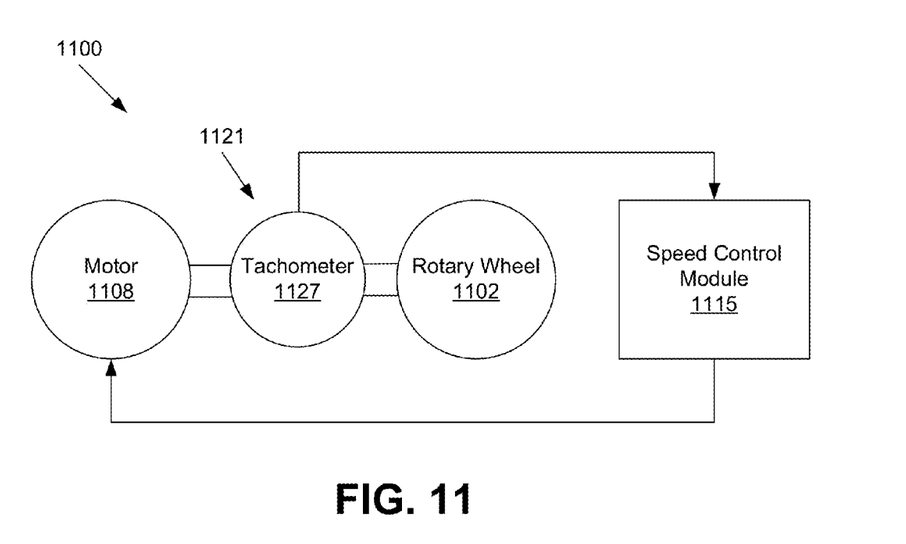
FIG. 11 illustrates a functional block diagram of a ball throwing machine having a speed measurement module with a tachometer to measure the rotational speed of the rotary wheel, in accordance with various embodiments.

Alternatively, as shown in FIG. 11, a ball throwing machine 1100 may include a speed measurement module 1121 that includes a tachometer 1127. The tachometer 1127 may be coupled to a rotary wheel 1002 and/or motor 1008 of the ball throwing machine 1100 to measure the rotational speed of the rotary wheel 1002. The speed measurement module 1121 may be communicatively coupled to a speed control module 1115 of the ball throwing machine 1100 to indicate the rotational speed of the rotary wheel 1002 to the speed control module 1115.

Figure 12:
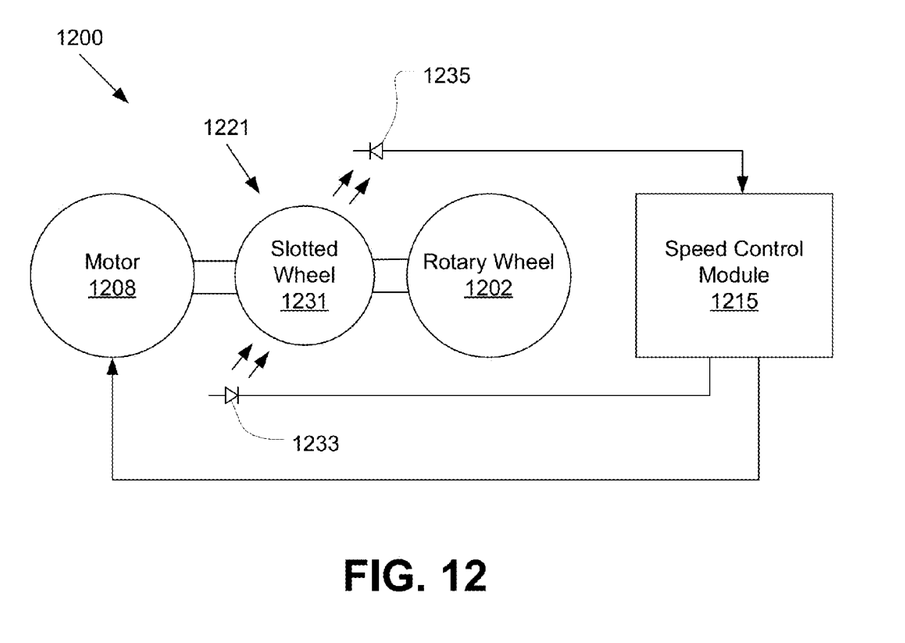
FIG. 12 illustrates a functional block diagram of a ball throwing machine having a speed measurement module to optically measure the rotational speed of the rotary wheel, in accordance with various embodiments.

As another alternative, as shown in FIG. 12, a ball throwing machine 1200 may include a speed measurement module 1221 that measures a rotational speed of a rotary wheel 1202 optically. The ball throwing machine 1200 may 1200 may further include a motor 1208 that drives rotation of the rotary wheel 1202. In one example, the speed measurement module 1221 may include a slotted wheel 1231 that is rotated by the motor 1208 at a rotational speed that is proportional to the rotational speed of the rotary wheel 1202. For example, the slotted wheel 1231 may be rotated at the same rotational speed as the rotary wheel 1202 and/or at a gear-reduced ratio. The slotted wheel 1231 may include one or more slots through the slotted wheel 1231 that allow light to pass through the slotted wheel 1231. The speed measurement module 1221 may further include an optical emitter 1233 to transmit light toward the slotted wheel 1231. The optical emitter 1233 may include, for example, one or more light-emitting diodes (LEDs) and/or lasers. The speed measurement module 1221 may further include an optical receiver 1235 configured to detect the light transmitted by the optical emitter 1233 that passes through the one or more slots of the slotted wheel 1231. The optical receiver 1235 may include, for example, one or more photodiodes. The speed measurement module 1221 may determine the rotational speed of the rotary wheel 1202, for example, based on the frequency that light is received by the optical receiver 1235 from the optical emitter 1233.

Although the fastball control module 116 and changeup control module 118 are shown in FIG. 3 as separate components within the speed control module 115, in other embodiments the fastball control module 116 and changeup control module 118 may be integrated into the same component. For example, the fastball control module 118 and changeup control module 118 may be a part of the same integrated circuit. Additionally, or alternatively, one or more components of the speed measurement module (e.g., speed measurement module 121, 1021, 1121, or 1221) may be integrated with one or more components of the speed control module (e.g., speed control module 115, 1015, 1115, or 1215).

Referring again to FIG. 3, in various embodiments, the speed control module 115 may use a resistive braking scheme to transition the motor 108 from the first rotational speed and the second rotational speed. The resistive braking scheme may allow the motor 108 to be transitioned relatively quickly from the first rotational speed to the second rotational speed, thereby facilitating changing from a fastball pitch to a changeup pitch without increasing the normal time delay between pitches. This may further prevent the batter from noticing that the changeup pitch is being thrown.

In various embodiments, the motor 108 may be an electric motor (e.g., a direct current (DC) motor or an alternating current (AC) motor). The motor 108 may receive an input signal at one or more input terminals 123. The rotational speed of the motor 108 may be based on one or more parameters of the input signal received by the motor 108. For example, the rotational speed of the motor 108 may be based on the voltage level of the input signal. In these embodiments, the input signal may also be referred to as the input voltage. In some embodiments, a higher input voltage may result in a higher rotational speed of motor 108 (and therefore a higher rotational speed of rotary wheel 102). In other embodiments, another parameter of the input signal may be used to control the speed of the motor, such as current, frequency, and/or duty cycle (e.g., pulse width modulation) of the input signal.

In various embodiments, the fastball control module 116 may produce a first voltage (i.e., a fastball voltage) at one or more output terminals 124, the first voltage having a voltage level that is based on the fastball speed setting. When the changeup control module 118 is in the unengaged state, the output terminals 124 of the fastball control module 116 may be communicatively coupled to the input terminals 123 of the motor 108 and the first voltage is passed to the motor 108 as the input voltage. The first voltage causes the motor 108 to rotate at the first rotary speed, thereby configuring the rotary wheel 102 to throw a fastball pitch.

When the changeup control module 118 is switched to the engaged state, the speed control module 115 may transition the input voltage from the first voltage to the second voltage. In some embodiments, the changeup control module 118 may interrupt the communicative coupling between the output terminals 124 of the fastball control module 116 and the input terminals 123 of the motor 108. The changeup control module 118 may then couple the input terminals 123 to a resistive load (not shown). The resistive load may cause the motor 108 to convert to a generator and feed the input voltage into the resistive load. This process may also be referred to as resistive braking and/or regenerative braking. The resistive braking may cause the voltage level of the input voltage to reduce quickly. The changeup control module 118 may couple the input terminals 123 to the resistive load until the input voltage reaches a second voltage (i.e., a changeup voltage). When the input voltage reaches the second voltage, the input terminals 123 may be coupled to a follower circuit (not shown). The follower circuit may produce the second voltage, so that the input voltage is held at the second voltage. The second voltage may cause the motor 108 to rotate at the second rotational speed, thereby configuring the rotary wheel 102 to throw a changeup pitch.

The resistive braking scheme used by the changeup control module 118 may allow the rotational speed of the motor 108 to be transitioned from the first rotational speed (corresponding to a fastball pitch) to the second rotational speed (corresponding to a changeup pitch) relatively quickly. For example, the motor 108 may transition from about 2500 rpm to about 2100 rpm in about 2-3 seconds. Thus, the ball throwing machine 100 may transition from throwing a fastball pitch to a changeup pitch without increasing a delay time between pitches.

In some embodiments, the resistive load may include one or more resistors. In some embodiments in which the power source is a battery, the resistive load may include the battery. In these embodiments, the motor 108 may recharge the battery when transitioning from the first voltage to the second voltage.

When the changeup control module 118 is switched back to the unengaged state, the input terminals 123 of the motor 108 are again communicatively coupled with the output terminals 124 of the fastball control module 116. The fastball control module 116 again feeds the first voltage to the motor 108 as the input voltage. The rotational speed of the rotary wheel 102 may ramp back up to the first rotational speed from the second rotational speed. In some embodiments, the rotary wheel 102 may ramp up to the first rotational speed according to a logarithmic function. The rotational speed of rotary wheel 102 may be substantially equal to the first rotational speed (i.e., at least 95% of the first rotational speed) prior to the next pitch.

In various embodiments, the ball throwing machine 100 may include a changeup switch 126 to toggle the changeup control module 118 between the engaged state and the unengaged state. In some embodiments, the changeup switch may be located on a handheld controller 128 communicatively coupled to the changeup control module 118. In some embodiments, as shown in FIG. 3, the handheld controller 128 may communicate wirelessly with the changeup control module 118. The handheld controller 128 may communicate with the changeup control module via radio frequency (RF) signals, and/or via any suitable wireless communication protocol, such as Bluetooth, a wireless broadband network (e.g., Wi-Fi, WiMax), and/or a cellular network. The handheld controller 128 may include an antenna 130 to transmit signals to (and/or receive signals from) the changeup control module 118, and the changeup control module 118 may include an antenna 132 to receive signals from (and/or transmit signals to) the handheld controller 128. The changeup switch 126 may include one or more buttons, toggles, sliders, a touchscreen, and/or other suitable actuators that may be actuated to tell the handheld controller 128 to send a signal to the changeup control module 118 to tell the changeup control module to change its state (e.g., from the unengaged state to the engaged state and/or from the engaged state to the unengaged state). In some embodiments, the handheld controller 128 may be a consumer electronics device, such as a personal digital assistant (PDA), mobile phone, personal computer (PC), tablet computer, and/or mp3 player.

In other embodiments, the handheld controller 128 may communicate with the changeup control module 118 over a wired connection. In yet other embodiments, the changeup switch 126 may be coupled to the body portion 104 and/or the control box 109.

In some embodiments, the changeup control module 118 may be selectively switched (e.g., by the handheld controller 128) from the unengaged state to the engaged state and from the engaged state to the unengaged state. Alternatively, or additionally, the changeup control module 118 may automatically switch back to the unengaged state from the engaged state after a period of time in the engaged state. The length of the period of time may be configured to allow enough time for the ball throwing machine 100 to throw one or more changeup pitches.

In some embodiments, the ball throwing machine 100 may be configured to automatically throw a changeup periodically. Accordingly, the changeup control module 118 may be configured to automatically switch from the engaged state to the unengaged state at pre-determined and/or random intervals. This may be especially suited for automatic feed machines and allow the athlete to practice hitting fastballs and/or changeups without the presence of an operator to control the ball throwing machine 100.

Figures 6, 7:
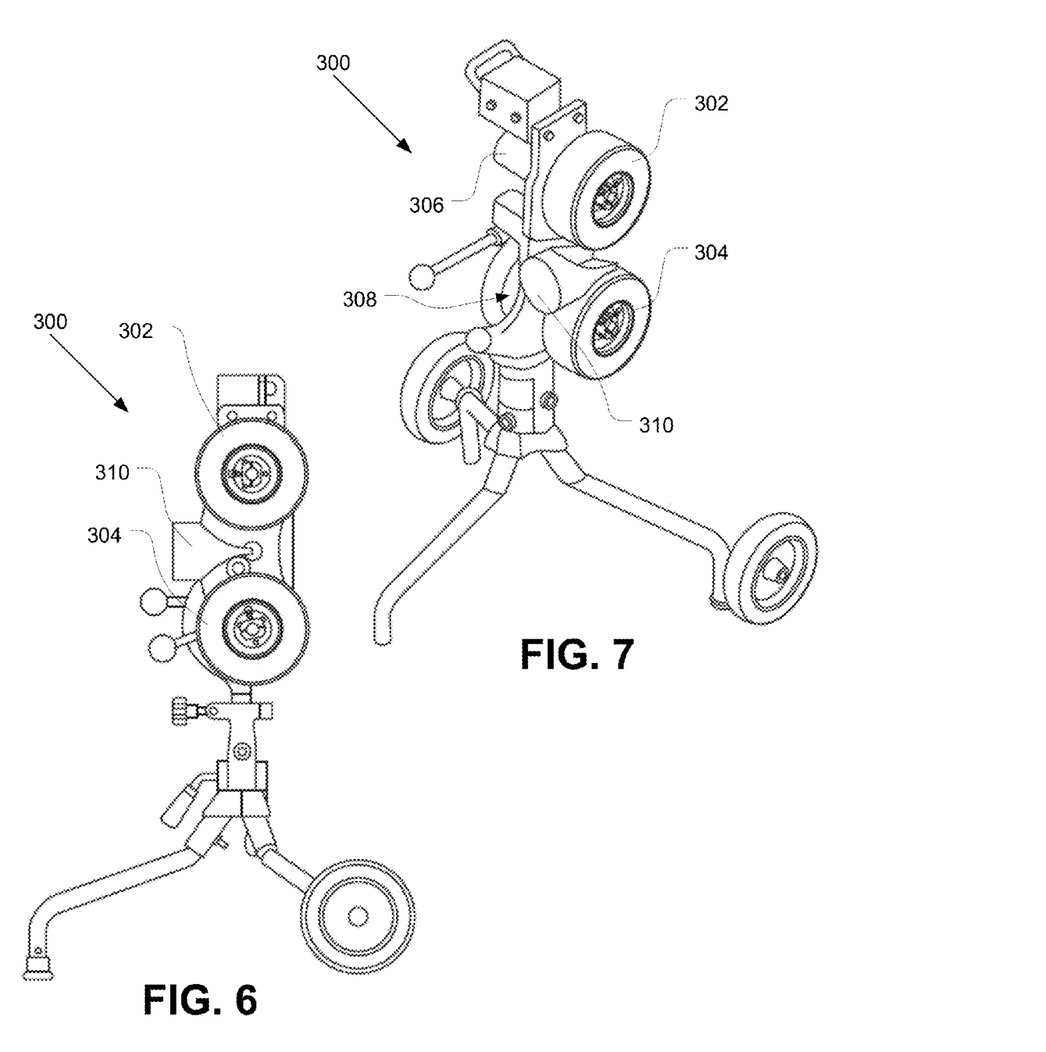
FIG. 6 illustrates a side view of a ball throwing machine having two rotary wheels, in accordance with various embodiments.
FIG. 7 illustrates a perspective view of the ball throwing machine of FIG. 6.

In other embodiments, the ball throwing machine may include any number of one or more rotary wheels, such as one, two, three or more rotary wheels. In some embodiments, each rotary wheel may be coupled to an associated motor. As shown in FIGS. 6 and 7, a ball throwing machine 300 including a first rotary wheel 302 and a second rotary wheel 304. The first rotary wheel 302 may be coupled to a first motor 306, and the second rotary wheel 304 may be coupled to a second motor 308. A feed structure 310 may be configured to receive a ball (not shown) and direct the ball between the outer circumferential surfaces of the first rotary wheel 302 and second rotary wheel 304. The ball may be pinched between the outer circumferential surfaces of first rotary wheel 302 and second rotary wheel 304, and the rotation of the rotary wheels may throw the ball forward. Accordingly, the ball throwing machine 300 may not include a pinch plate.

The first rotary wheel 302 and second rotary wheel 304 may be oriented vertically (as shown in FIGS. 6 and 7), horizontally, and/or at an angle between vertical and horizontal. In some embodiments, the orientation of the first rotary wheel and/or second rotary wheel 304 may be adjustable between the vertical orientation and/or the horizontal orientation.

In some embodiments, the first motor 306 and second motor 308 may be controlled independently to independently control the rotational speed of the first rotary wheel 302 and/or the second rotary wheel 304. Each motor may be coupled to a speed control module as described above. In other embodiments, the first motor 306 and second motor 308 may both be controlled by the same speed control module. The plurality of rotating wheels may be used to throw a variety of pitches including fastballs, changeups, curveballs, sinkers, risers, and/or sliders. Accordingly, the speed control module and/or changeup algorithm may be configured to control the rotational speed of one or more of the rotating wheels to throw any number of suitable pitches within the target zone.

Figure 8:
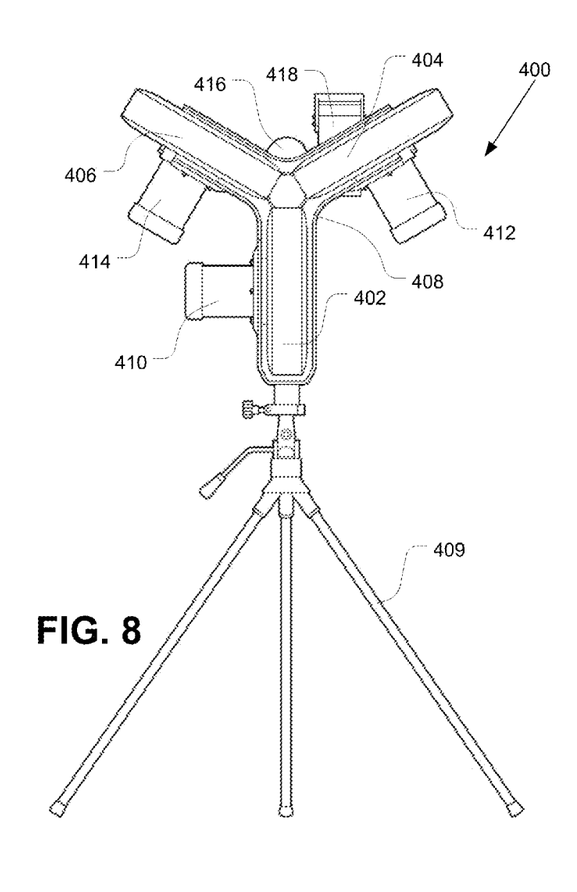
FIG. 8 illustrates a front view of a ball throwing machine having three rotary wheels, in accordance with various embodiments.
Figure 9:
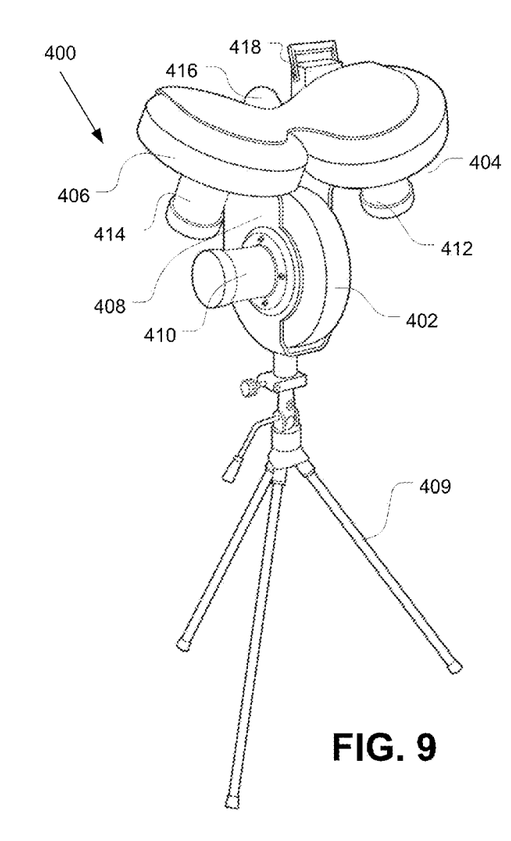
FIG. 9 illustrates a perspective view of the ball throwing machine of FIG. 8.

As shown in FIGS. 8 and 9, a ball throwing machine 400 may include a first rotary wheel 402, a second rotary wheel 404, and a third rotary wheel 406, each coupled to a body portion 408. The ball throwing machine 400 may be supported by a support structure 409 (e.g., a tripod). A first motor 410 may be coupled to the first rotary wheel 402, a second motor 412 may be coupled to the second rotary wheel 404, and a third motor 414 may be coupled to the third rotary wheel 406. A feed structure 416 may be configured to receive a ball (not shown) and direct the ball between the outer circumferential surfaces of the first rotary wheel 402, second rotary wheel 404, and third rotary wheel 406. The ball may be pinched between the outer circumferential surfaces, and the rotation of the rotary wheels may throw the ball forward. Accordingly, the ball throwing machine 400 may not include a pinch plate.

The first rotary wheel 402, second rotary wheel 404, and third rotary wheel 406 may be oriented in any suitable orientation with respect to one another. In some embodiments, the orientation of one or more of the rotary wheels may be adjustable.

In some embodiments, the first motor 410, second motor 412, and/or third motor 414 may be controlled independently to independently control the rotational speed of the respective rotary wheel. Each motor may be coupled to a control box 418. The control box 418 may include a speed control module, as described above, to control the rotational speed of the first motor 410, second motor 412, and/or third motor 414. In some embodiments, each motor may be controlled by a separate speed control module. In other embodiments, two or more of the first motor 410, second motor 412 and/or third motor 414 may be controlled by the same speed control module. The plurality of rotating wheels may be used to throw a variety of pitches including fastballs, changeups, curveballs, sinkers, risers, and/or sliders. Accordingly, the speed control module and/or changeup algorithm may be configured to control the rotational speed of one or more of the rotating wheels to throw any number of suitable pitches within the target zone.

Although the ball throwing machine has been described herein as being used to throw pitches to a batter, the ball throwing machine may also be used to throw balls for other purposes, such as to practice catching, fielding (e.g., ground balls and/or fly balls), and/or other purposes. Furthermore, although the ball throwing machine has been described herein with reference to throwing baseballs and/or softballs, the ball throwing machine may be used to throw any suitable ball or other object, such as tennis balls and/or footballs. The terms changeup and fastball are not meant to be limited to baseballs and/or softballs and may be used to describe throwing any object at different relative speeds.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A ball throwing machine comprising:
    a body;
    a rotary wheel coupled to the body;
    a motor coupled to the rotary wheel and configured to rotate the rotary wheel;
    a feed structure coupled to the body portion and configured to receive a ball and direct the ball to an outer circumferential surface of the rotary wheel, the rotary wheel configured to throw the ball outwardly from the ball throwing machine toward an athlete;
    a speed measurement device configured to measure the rotational speed of the rotary wheel;
    a speed control circuit coupled to the motor and the speed measurement device, the speed control circuit selectively switchable between a fastball setting and a changeup setting and configured to control the motor to rotate the rotary wheel at a first rotational speed during the fastball setting and to control the motor to rotate the rotary wheel at a second rotational speed during the changeup setting, wherein the second rotational speed is slower than the first rotational speed;
    wherein the speed control circuit is configured to set a value of the second rotational speed based on a value of the first rotational speed so that the ball will arrive at the athlete in a target zone during the fastball setting and the changeup setting without adjusting a position of the rotary wheel and without adjusting a position of the feed structure.

2. The ball throwing machine of claim 1, wherein the speed measurement device is configured to measure the rotational speed of the rotary wheel magnetically.

3. The ball throwing machine of claim 2, wherein the speed measurement device includes one or more magnets coupled to the rotary wheel, and a magnetic detector configured to measure the rotational speed of the rotary wheel based on detection of the one or more magnets.

4. The ball throwing machine of claim 1, wherein the speed measurement device includes a tachometer coupled to the motor or rotary wheel.

5. The ball throwing machine of claim 1, wherein the speed measurement device is configured to measure the rotational speed of the rotary wheel optically.

6. The ball throwing machine of claim 5, wherein the speed measurement device includes:
    a slotted wheel configured to be rotated by the motor and having one or more slots;
    an optical emitter configured to transmit light toward the slotted wheel; and
    an optical receiver configured to receive light transmitted by the optical emitter that passes through the one or more slots of the slotted wheel.

7. The ball throwing machine of claim 1, wherein the speed control circuit is configured to generate a control signal to control the rotational speed of the rotary wheel, and wherein the speed measurement device is configured to measure the rotational speed of the rotary wheel based on a parameter of the control signal.

8. The ball throwing machine of claim 1, wherein the feed structure includes a pinch plate spaced from an outer surface of the rotary wheel to pinch the ball against the outer surface of the rotary wheel.

9. The ball throwing machine of claim 1, further comprising a handheld controller configured to communicate wirelessly with the speed control circuit to selectively place the speed control circuit in the fastball setting or the changeup setting.

10. The ball throwing machine of claim 1, wherein the speed control circuit is configured to automatically switch to the fastball setting from the changeup setting after a time period in the changeup setting.

11. The ball throwing machine of claim 1, wherein the second rotational speed is determined based on the first rotational speed using a changeup algorithm, and the changeup algorithm includes a polynomial function.

12. The ball throwing machine of claim 1, wherein the rotary wheel is a first rotary wheel, and wherein the ball throwing machine includes a plurality of rotary wheels including the first rotary wheel, the plurality of rotary wheels configured to throw the ball in cooperation with one another.

13. A method to be employed by a ball throwing machine, the method comprising:
    measuring a value of a first rotational speed of a rotary wheel of the ball throwing machine during a fastball setting of the ball throwing machine in which the rotary wheel is configured to throw a ball at a first speed;
    determining, by a speed controller, a target value for a second rotational speed of the rotary wheel during a changeup setting of the ball throwing machine in which the rotary wheel is configured to throw a ball at a second speed that is less than the first speed, wherein the target value of the second rotational speed is determined based on the measured value of the first rotational speed so that the ball is thrown within a target zone during the fastball setting and the changeup setting without adjusting a position of the rotary wheel and without adjusting a position of a feed structure of the ball throwing machine; and
    rotating the rotary wheel at the second rotational speed during the changeup setting of the ball throwing machine.

14. The method of claim 13, wherein the value of the first rotational speed is measured magnetically.

15. The method of claim 14, wherein the value of the first rotational speed is measured using one or more magnets coupled to the rotary wheel and a magnetic detector configured to detect the one or more magnets as the one or more magnets rotate.

16. The method of claim 13, wherein the value of the first rotational speed is measured using a tachometer.

17. The method of claim 13, wherein the value of the first rotational speed is measured optically.

18. The method of claim 17, wherein the value of the first rotational speed is measured using:
    a slotted wheel configured to be rotated at a rotational speed that is based on the rotational speed of the rotary wheel;
    an optical emitter configured to transmit light toward the slotted wheel; and
    an optical receiver configured to receive light transmitted by the optical emitter that passes through the one or more slots of the slotted wheel.

19. The method of claim 13, wherein the rotational speed of the rotary wheel is controlled by a control signal, and wherein the value of the first rotational speed is measured based on a parameter of the control signal.

\* \* \* \* \*